Patented June 3, 1930

1,761,677

UNITED STATES PATENT OFFICE

HERMAN C. NIELSEN, OF MEMPHIS, TENNESSEE

WAXING COMPOSITION

No Drawing. Application filed March 14, 1929. Serial No. 347,043.

The present invention relates to a composition for application to floors which have been finished, for example floors which have been varnished, lacquered or the like, whether or not such floors have been previously treated with impregnating materials.

It is understood that the boards or blocks or other units of which a floor is constructed may swell more or less during wet weather or at other times due to contact with excessive amounts of moisture, and such floors will likewise shrink in the individual boards or units, during very dry times, and both of these conditions produce an unsightly appearance of the floor.

In accordance with the present invention I apply a wax which completely fills the small cracks, and which composition does not, after drying, produce an objectionable hard material which will be driven as such into the edges of the boards or the like. The composition will easily be worked into the cracks of the flooring, and even after drying, the excess will be forced out of the cracks if the wood should swell somewhat, due to absorption of moisture or similar causes.

In the preferred form of the invention, I may use the following substances in approximately the proportions stated:—

15% beeswax, 10% carnauba wax, 10% paraffin wax, 37% turpentine, 9% wood flour, 2% yellow ocher, 10% lithopone, 5% sulphur, 2% gum camphor.

The proportions of the three waxes as given in the above formula amounts to 35% of the entire mixture. This proportion can be varied somewhat say from about 30% up to 38%, and the relative proportion of the waxes to each other can likewise be varied more or less. Thus the proportions of the different waxes can vary, from about 5% up to about 20% of the entire mass.

The turpentine employed is preferably wood turpentine, although gum turpentine can be employed. Steam distilled wood turpentine gives generally very satisfactory results, particularly if the refined article is employed. The proportion of turpentine can vary from about 30 to 45% of the entire mixture.

Wood flour is stated as being about 9% in the above formula. This has been found to give very satisfactory results, but the proportion can be varied from about 5 to 15%.

Yellow ocher has been above mentioned, but it will be understood that various other suitable colored pigments, depending upon the color of the floor to which the wax is to be applied, can be used. The proportion can also vary to some extent, say from about 1% to about 5%.

Lithopone is mentioned in the above formula, but other white pigments which are not too hard or too abrasive can be employed. Some white pigments are composed of very hard grains, the results of which would be to more or less scratch and mar the varnish, and such pigments are preferably not employed.

Instead of gum camphor, synthetic camphor can be employed or the camphor substitutes which are commonly used in the celluloid industry. Tricresyl phosphate is mentioned, and mixtures of this with triphenyl phosphate. The function of this material is to keep the product soft and plastic, after application of the same, and the proportion of the material can be varied more or less. It will be understood that camphor and camphor substitutes are all relatively expensive and I preferably do not use any more of these than is necessary. From 0.5% up to about 2% or even 2.5%, seems to cover the most suitable range of proportion of this material.

In making the composition I take the lithopone, sulphur and color, and mix them with a part of the turpentine, in order to make a paste suitable to be ground in a burr mill or other suitable paint mill. I then melt the waxes at a low temperature. I then dissolve the camphor or camphor substitute in the remainder of the turpentine at a low temperature, and add this to the paste and well stir, keeping the mass at about 150° F. Then I add the wood flour and mix well, and add the melted wax and again well stir. The material is then ready to be filled into the cans or other containers.

The wax will be rubbed into the floor, without injury to the finish already applied. It cleans the varnished surface or lacquered surface and gives a lustrous and durable finish. On account of the composition of this material it remains permanently soft so that it does not injure the flooring and does not cause the flooring to warp during swelling due to moisture. The material has the advantage of preventing filthy dirt, germs and the like from gathering in the cracks of the floors, and gives a beautiful finish.

On account of the proportions of these different waxes, a good polish is produced by only a minimum of rubbing with a rag or the like.

The beeswax furnishes the hard lustrous finish, the carnauba wax assists greatly in producing the quick polish with a minimum amount of rubbing and the paraffin wax assists in the spreading. The solvent liquids also assist in cleaning the floor. The sulphur keeps the whole composition more or less rubbery and prevents oxidation and prevents the material from becoming excessively brittle, even after a long time. The sulphur also appears to prevent oxidation of the waxes and has a disinfectant effect, destroying many kinds of germs, spores, fungi and acts as a preservative upon the wood.

I have referred above chiefly to applying the material to floors. It will be understood however that it can also be applied to other woodwork, furniture, and the like.

The materials which are solids, such as the wood flour, pigment and sulphur can of course be employed in the form of finely powdered materials, in order to remain thoroughly blended with the other constituents, so as to be carried into the cracks and crevices in the floor or other surface being treated.

I claim:—

1. A waxing composition suitable for use on finished floors, comprising the following in substantially the proportions specified:— 15% beeswax, 10% carnauba wax, 10% paraffin wax, 37% turpentine, 9% wood flour, 12% pigment, 5% sulfur, 2% camphor-like material.

2. A waxing composition suitable for waxing finished floors comprising beeswax, carnauba wax and paraffin wax, all amounting to about 25 to 24%, about 30 to 45% of turpentine, wood flour and pigment amounting together to about 15 to 25%, about 4 to 7% of sulfur and about 0.5 to 2.5% of a camphor-like material.

3. A floor wax composition containing waxes, solvent, and fillers and containing about 5% of powdered sulfur and about 2% of a camphor-like material.

4. Floor wax containing substantial amounts of powdered sulfur and camphor-like material.

In testimony whereof I affix my signature.

HERMAN C. NIELSEN.